United States Patent Office 3,139,339
Patented June 30, 1964

3,139,339
PHOTOCONDUCTOR COATINGS FOR ELECTRO-
PHOTOGRAPHIC PURPOSES
Heinz Schlesinger, Wiesbaden, and Wilhelm Neugebauer,
Wiesbaden-Biebrich, Germany, assignors, by mesne
assignments, to Azoplate Corporation, Murray Hill,
N.J., a corporation of New Jersey
No Drawing. Filed Nov. 8, 1960, Ser. No. 67,880
Claims priority, application Germany Nov. 26, 1959
28 Claims. (Cl. 96—1)

Inorganic materials such as selenium and zinc oxide and various organic compounds of lower molecular weight such as anthracene and benzidine, have already been used as photoconductor coatings for electrophotographic purposes.

Photoconductor coatings for electrophotographic purposes have now been found which consist at least in part of one or more quinazolines of the general formula

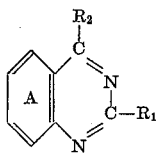

in which $R_1$ is aryl or substituted aryl, $R_2$ is aryl, substituted aryl, aryl-vinyl, aralkyl, aryloxy or a heterocycle and in which the aromatic ring, A, may be substituted or condensed with a ring.

Exemplary $R_1$ and $R_2$ substituents, which may or may not be identical, are aryl groups such as phenyl, naphthyl, phenanthryl, and anthryl; aryl-vinyl groups such as styryl; lower alkyl such as methyl, ethyl and propyl substituted by aryl (e.g., phenyl), by aryloxy (e.g., naphthoxy and phenoxy) or by heterocycles (e.g., carbazole and quinoline), and substituted aryl residues, the substituents used being those that do not essentially affect conductivity. Such substituents are, for example, lower alkyl groups such as methyl, ethyl, propyl, butyl, and aryl; lower alkoxy groups such as methoxy ethoxy, propoxy and butoxy; nitro groups, the halogens (e.g., chlorine, bromine and iodine) amino groups, alkylated amino groups such as dimethylamino, diethylamino, dipropylamino, and acylamino groups, e.g., acetamido groups.

Amino groups and substituted amino groups have proved particularly advantageous. Also, a plurality of the substituents may be present in the same residue.

The quinazolines of the above general formulae are prepared by the condensation of N-aryl-acyl-imido chlorides or N-aryl-acyl-imino-ethers with the corresponding cyano compounds in the presence of electrophilic metal chlorides, by the synthetic method described by Meerwein et al., in Chem.-Berichte 89, 224 (1956).

Formulae of exemplary compounds are:

Formula 1

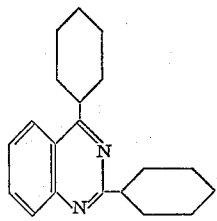

Formula 2

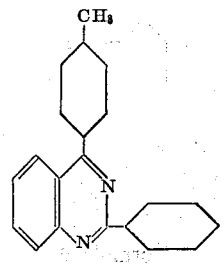

Formula 3

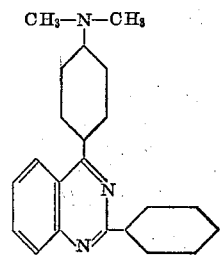

Formula 4

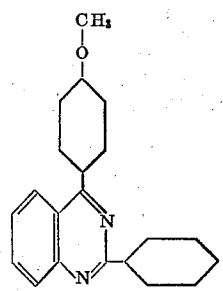

Formula 5

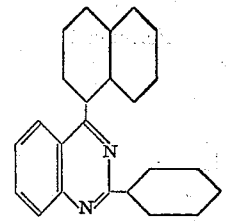

Formula 6

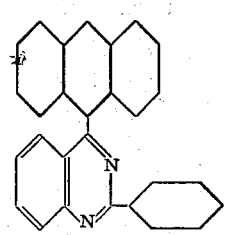

Formula 7
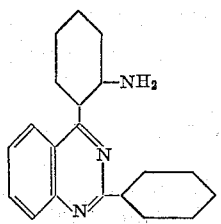
Formula 8
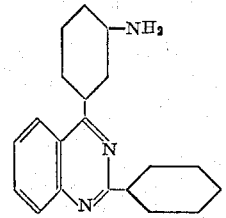
Formula 9
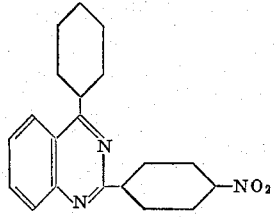
Formula 10
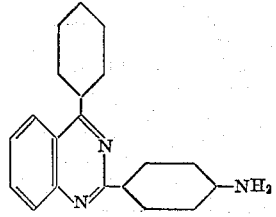
Formula 11
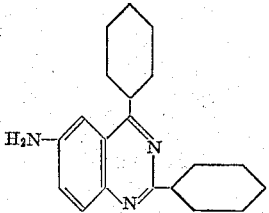
Formula 12
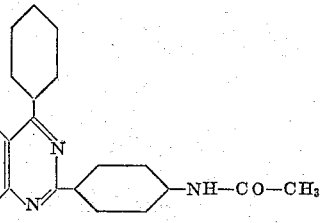
Formula 13
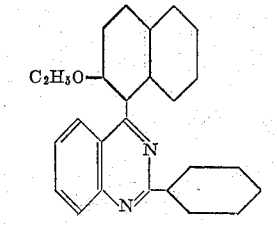
Formula 14
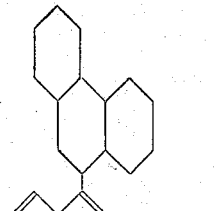
Formula 15
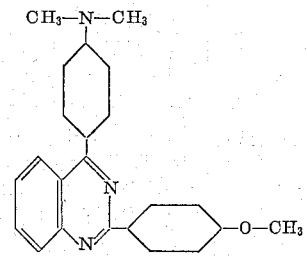
Formula 16
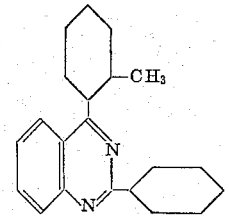
Formula 17
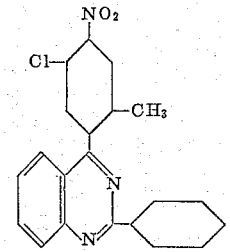
Formula 18
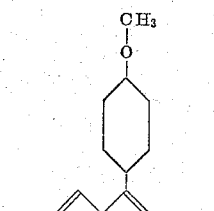
Formula 19
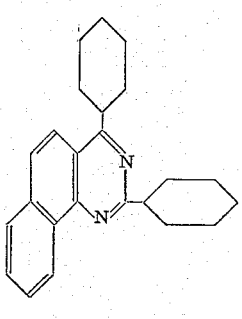

Formula 20

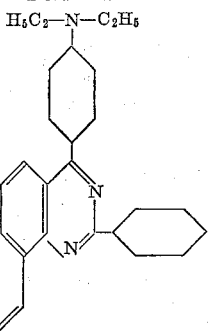

Formula 21

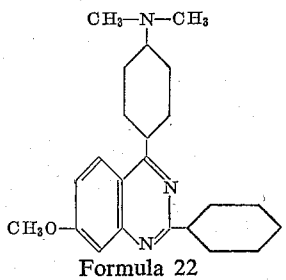

Formula 22

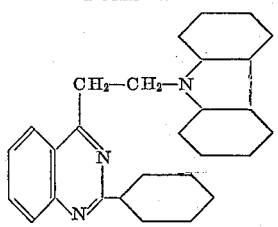

Formula 23

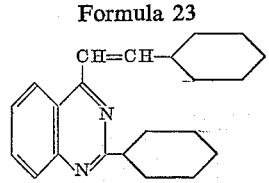

Formula 24

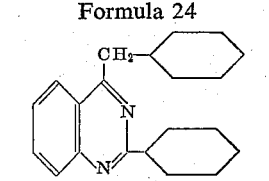

Formula 25

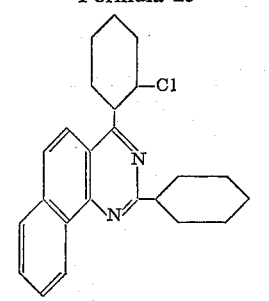

Formula 26

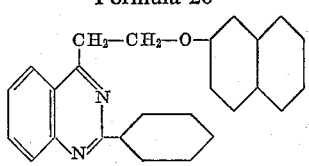

The following summary contains data relative to the compounds of the above formulae which may be used in accordance with the invention.

The various columns are as follows:

Column 1: Number of the compound
Column 2: Name of the quinazoline
Column 3: Melting point of the quinazoline
Column 4: Color of the quinazoline

| 1 | 2 | 3 | 4 |
|---|---|---|---|
| | | °C. | |
| 1 | 2,4-diphenyl-quinazoline | 121-122 | Colorless. |
| 2 | 2-phenyl-4-(4'-tolyl)-quinazoline | 127-129 | Bright yellow. |
| 3 | 2-phenyl-4-(4'-dimethylamino-phenyl)-quinazoline. | 154 | Do. |
| 4 | 2-phenyl-4-(4'-methoxy-phenyl)-quinazoline. | 130 | Colorless. |
| 5 | 2-phenyl-4-naphthyl-(1')-quinazoline | 176-178 | Do. |
| 6 | 2-phenyl-4-anthranyl (9')-quinazoline | 284-286 | Bright yellow. |
| 7 | 2-phenyl-4-(2'-amino-phenyl)-quinazoline. | 176 | Yellow. |
| 8 | 2-phenyl-4-(3'-amino-phenyl)-quinazoline. | 222 | Bright yellow. |
| 9 | 2-(4'-nitrophenyl)-4-phenyl-quinazoline. | 210 | Pale yellow. |
| 10 | 2-(4'-amino-phenyl)-4-phenyl-quinazoline. | 167 | Yellow. |
| 11 | 2,4-diphenyl-6-amino-quinazoline | 170 | Do. |
| 12 | 2-(4'-acetamino-phenyl)-4-phenyl-quinazoline. | 215-216 | Colorless. |
| 13 | 2-phenyl-4-(2'-ethoxy-naphthyl-(1'))-quinazoline. | 137-138 | Bright yellow. |
| 14 | 2-phenyl-4-phen-anthryl-(9')-quinazoline. | 278 | Colorless. |
| 15 | 2-(4'-methoxy-phenyl)-4-(4''-dimethylamino-phenyl)-quinazoline. | 170-171 | Yellow. |
| 16 | 2-phenyl-4-(2'-tolyl)-quinazoline | 145-146 | Colorless. |
| 17 | 2-phenyl-4-(2'-methyl-4'-nitro-5'-chlor-phenyl)-quinazoline. | 170-171 | Pale yellow. |
| 18 | 2-phenyl-4-(4'-methoxy-phenyl)-7-methoxy-quinazoline. | 141-142 | Do. |
| 19 | 2,4-diphenyl-7,8-benzo-quinazoline | 156-157 | Colorless. |
| 20 | 2-phenyl-4-(4'-di-ethylamino-phenyl)-7,8-benzo-quinazoline. | 169-170 | Yellow. |
| 21 | 2-phenyl-4-(4'-di-methyl-amino-phenyl)-7-methoxy-quinazoline. | 178-179 | Do. |
| 22 | 2-phenyl-4-(2'-carbazolyl-(9'')-ethyl)-quinazoline. | 162-164 | Do. |
| 23 | 2-phenyl-4-styryl-quinazoline | 144-145 | Bright yellow. |
| 24 | 2-phenyl-4-benzyl-quinazoline | 129 | Colorless. |
| 25 | 2-phenyl-4-(2'-chlor-phenyl)-7,8-benzo-quinazoline. | 163-164 | Do. |
| 26 | 2-phenyl-4-(2'-naphthoxy-(2'')-ethyl)-quinazoline. | 161-162 | Pale yellow. |

For their employment as photoconductor coatings in electrophotography, the quinazolines described above are preferably dissolved in an organic solvent and coated upon a support, e.g., the solution is cast, painted, or sprayed thereon or applied by rollers and the solvent is then evaporated. The products can also be applied in the form of aqueous or non-aqueous dispersions. Also, mixtures of the compounds may be used.

The quinazolines of the invention can also be used in association with resins. The photoconductor coatings can thus include natural resins such as colophony, balsam resins, and shellac; synthetic resins such as colophony-modified phenol resins; other resins in which colophony is the major constituent and also coumarone resin, indene resin and compounds defined by the collective term "synthetic lacquer resins." These include processed natural resins such as cellulose ether, polymers such as vinyl polymers, e.g., polyvinyl-chloride, polyvinylidene chloride, polyvinyl acetate, polyvinyl acetals, polyvinyl ether, and polyacrylic and polymethacrylic acid ester; also polystyrene, polyisobutylene, chlorinated rubber, and polycondensates, e.g., polyesters such as phthalate resin, alkyd resin, maleinate resins, maleic acid/colophony/mixed esters of higher alcohols; phenolformaldehyde resins, particularly colophony-modified phenol-formaldehyde condensates, urea-formaldehyde condensates, melamine-formaldehyde resins, aldehyde resins, ketone resins, particularly AW2 resins, xylene-formaldehyde resins, polyamides and polyadducts, e.g., polyurethanes. Also, polyolefins such as various polyethylenes and polypropylenes and phthalic acid polyesters such as terephthalic and isophthalic acid ethyleneglycol polyesters may be used.

If the photoconductive coatings of the invention are used in association with the resins described above, the proportions of resin to photoconductor material can vary very greatly. Proportions of between two parts of resin to one part of photoconductor material and two parts of photoconductor material to one part of resin are preferable. Mixtures of the two materials in equal proportions by weight are particularly favorable. However, where resins are used in the coatings, the content of photoconductive compound should be at least 20 percent.

The base materials used as supports may be any that satisfy the requirements of electrophotography, e.g., metal or glass plates, paper or plates or foils made of electroconductive resins or plastics, such as polyvinyl alcohol, polyamides, and polyurethanes. Other plastics which have the required electroconductivity, such as cellulose acetate and cellulose butyrate, especially in a partially saponified form, polyesters, polycarbonates, and polyolefines, if they are covered with an electroconductive layer or if they are converted into electroconductive materials, e.g., by chemical treatment with or by introduction of materials which render them electrically conductive, may also be used. Generally speaking, electroconductive supports are suitable for the purposes of the present invention. In the sense of the present invention, the term "electroconductive support" comprises materials having a specific conductivity higher than $10^{-12}$ ohm$^{-1}$.cm.$^{-1}$, preferably higher than $10^{-10}$ ohm$^{-1}$.cm.$^{-1}$.

The supporting material, provided with a thin coherent coating of even thickness of the photoconductor layer as described above, is used for the preparation of copies by electrophotographic means in the following manner: The photoconductor coating is evenly charged in the absence of light, e.g., by a corona discharge from a charging device maintained at 6000–7000 volts. The electrocopying material is then exposed to light under a master or, alternatively, an episcopic or diascopic image of the master is projected thereon. An electrostatic image corresponding to the master is then formed on the material. This invisible image is developed by contact with a developer consisting of a carrier and a toner. In particular, fine glass balls, iron powder or fine plastic balls are used as the carrier. The toner consists of a mixture of resin and carbon black or of pigmented resin. The toner is generally used in a particle size of about 1–100µ preferably 5–30µ. The developer may also consist of a resin or pigment suspended in a dielectric liquid in which resins may be dissolved. In the case of dry development, the image which has been rendered visible is then fixed, e.g., by heating to 100–170° C., preferably 120–150° C., with an infra-red radiator, or by treatment with solvents such as trichloroethylene, carbon tetrachloride, ethyl alcohol or steam. In this manner images are obtained which correspond to the masters and which have good contrast effect.

If the polarity of the electrical charge used is opposite to the polarity of the toner contained in the developer, images corresponding to the master characterized by good contrast effect are obtained. By changing the polarity of the corona discharge, it is also possible to obtain reversed images from the same master and with the same developer. However, it is preferred also to change from a positive master to a negative master, and vice versa, when changing the polarity in order to obtain the best results. This is an advantage over photoconductors such as zinc or selenium, which can be charged with one polarity only to give good images.

These electrophotographic images can also be converted into printing plates. For this purpose they are wiped over with a suitable solvent, or with a preferably alkaline aqueous developer liquid, rinsed down with water and then inked up with greasy ink. In this way printing plates are obtained which can be set up in an offset machine and used for printing.

If transparent supporting material is used, the electrophotographic images can also be used as masters for further copying on any type of coatings. With translucent supporting material for the photoconductive coatings, images can also be produced by the reflex process.

Sensitizers, also, can be added to the photoconductor coatings to increase the sensitivity thereof. Such sensitizers are effective even in very small quantities, e.g., less than 0.01 percent. In general, however, 0.01 to 5 percent, preferably 0.05 to 3 percent of dyestuff sensitizer is added to the photoconductor coatings. The addition of larger quantities is possible but in general is not accompanied by any significant increase in sensitivity.

Some examples are given below of dyestuff sensitizers which may be used with good results, and some with very good results. They are taken from Schultz' "Farbstofftabellen," 7th edition, 1931, 1st vol.:

Triarylmethane dyestuffs such as Brilliant Green (No. 760, p. 314), Victoria Blue B (No. 822, p. 347), Methyl Violet (No. 783, p. 327), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Sulphorhodamine B (No. 863, p. 364) and Fast Acid Eosin G (No. 870, p. 368); also phthaleins such as Eosin S (No. 883, p. 375), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 449); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); cyanine dyestuffs, e.g., Cyanine (No. 921, p. 394) and chlorophyll.

The photoconductor coatings described above can be used both in reproduction processes and in measuring instruments for recording purposes, e.g., photographic recording instruments. They can also be used in the production of other devices containing photoconductors, e.g., photoelectric cells, photoresistances, sensing heads or camera tubes.

The photoconductor coatings of the present invention may also be used in association with other photoconductors and with pigments such as titanium dioxide.

By way of example, the preparation is described below of one of the products of the invention. 2-phenyl-4-(4'-dimethyl-aminophenyl)-quinazoline, corresponding to Compound 3 of the table, is prepared as follows: 6.7 parts by weight of powdered anhydrous aluminum chloride are added to a solution of 10.3 parts by weight of benzanilide imidochloride and 7.3 parts by weight of 4-dimethylamino-benzonitrile in 100 parts by volume of dry 1,2-dichlorobenzene at 120° C. and the mixture is stirred for two hours at this temperature. After cooling, an excess of 20 percent sodium hydroxide solution is added with stirring, the 1,2-dichlorobenzene is removed by steam distillation and the solid product remaining is purified by recrystallization from ethanol. Bright yellow crystals with a melting point of 154° C. are obtained.

The invention will be further illustrated by reference to the following specific examples:

*Example 1*

0.5 part by weight of 2-phenyl-4-(4'-dimethylaminophenyl)-quinazoline (Compound 3 of table) and 0.5 part by weight of a ketone resin ("Kunstharz SK") are dissolved in 15 parts by volume of toluene. This solution is coated upon paper the surface of which has been treated against the penetration of organic solvents. When the solvent has evaporated, a firmly adherent coating remains on the surface of the paper.

With the paper thus coated, an image is produced directly by the electrophotographic process. The dry coating is provided with a negative electric charge using a corona discharge produced from a charging apparatus maintained at about 6000 volts, exposed beneath a master to the light of a high-pressure mercury vapor lamp (125 watts) and then dusted over with a developer in known manner. The developer consists of tiny glass balls and a very finely divided resin/carbon black mixture known as the toner. The black colored resin adheres to those portions that were not affected by the light during the exposure and an image corresponding to the master becomes visible. It is fixed by heating.

The developer used in the above case consists of 100 parts by weight of glass balls of a particle size of 350–400μ and 2.5 parts by weight of a toner of a particle size of 20–50μ. The toner is obtained by melting together 30 parts by weight of polystyrene, 30 parts by weight of a modified maleic acid resin (e.g., "Beckacite" K105) and 3 parts by weight of carbon black (e.g., "Peerless Black" Russ 552), after which the melt is ground and screened.

Example 2

Paper is coated, as described in Example 1, and the coating is provided, by a corona discharge, with a positive charge. After it has been exposed to light under a master, the image thus produced on a paper foil is developed by dusting over with a developer, as described in Example 1, but with glass balls covered with resin, e.g., coumarone resin, as a carrier. As the coumarone resin coating for the glass balls, the commercial product Cumaronharz 601/90 is advantageously used. A good positive image of the master, rich in contrast, is similarly obtained.

Example 3

0.5 part by weight of 2-phenyl-4-(4'-dimethylamino-phenyl)-quinazoline (Compound 3 of the table) and 0.5 part by weight of an unsaponified ketone-aldehyde condensation resin ("Kunstharz AP") are dissolved in 15 parts by volume of ethyleneglycol monomethylether. The solution is applied to an aluminum foil. After the solvent has evaporated, a coating remains which adheres firmly to the surface of the foil. With the coated aluminum foil, images can be prepared from masters electrophotographically in a manner known per se.

Example 4

0.17 part by weight of each of the following three quinazolines are dissolved in 15 parts by volume of toluene:

2-phenyl-4-(4'-dimethylamino-phenyl)-quinazoline (Compound 3 of the table)
2-phenyl-4-naphthyl-(1')-quinazoline (Compound 5 of the table)
2-phenyl-4-anthranyl-(9')-quinazoline (Compound 6 of the table)

With this solution a paper is coated, as described in Example 1, and then an electrophotographic image is prepared.

Example 5

0.5 part by weight of 2-phenyl-4-anthranyl-(9')-quinazoline (Compound 6 of the table) and 0.5 part by weight of a ketone resin ("Kunstharz SK") are dissolved in 15 parts by volume of toluene. The solution is coated on an aluminum foil, upon which, after evaporation of the toluene, a firmly adherent coating remains. Electrophotographic images are prepared as described in Example 1.

Example 6

0.5 part by weight of 2-phenyl-4-(4'-dimethylamino-phenyl)-quinazoline (Compound 3 of the table), 0.5 part by weight of a ketone resin ("Kunstharz SK") and 0.005 part by weight of Ethyl Violet (Schultz' "Farbstofftabellen," 7th edition, vol. I, No. 787) are dissolved in 15 parts by volume of ethyleneglycol monomethylether.

The solution is coated upon paper. After it has dried, an electrophotographic image is prepared, as described in Example 1, a 100-watt filament lamp being used for the exposure.

Example 7

0.5 part by weight of 2-(4'-aminophenyl)-4-phenyl-quinazoline (Compound 10 of the table) and 0.5 part by weight of a zinc resin ("Erkazit Zinkharz 165") are dissolved in 15 parts by volume of benzene. After the solution has been coated upon a supporting material such as paper or aluminum foil, an electrophotographic image is prepared in known manner.

Example 8

0.5 part by weight of a chlorinated polyvinyl chloride ("Rhenoflex") is dissolved in 5 parts by volume of methyl-ethyl-ketone and 0.5 part by weight of 2,4-diphenyl-7,8-benzo-quinazoline (Compound 19 of the table), dissolved in 10 parts by volume of toluene, is added to this solution. The solution is then coated upon a transparent paper lacquered with acetyl cellulose. Images are then produced on this transparent paper by the electrophotographic process. They can be used as intermediate originals for further copying, on diazo paper, for example.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter comprising a quinazoline compound having the formula

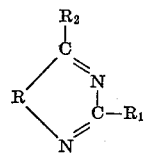

in which R is an ortho-arylene group, $R_1$ is an aryl group, and $R_2$ is selected from the group consisting of aryl, alkyl, aralkylene, and aralkyl groups.

2. An electrophotographic material according to claim 1 in which the photoconductive layer contains at least one compound selected from the group consisting of resins and optical sensitizers.

3. An electrophotographic material comprising a conductive support layer and a photoconductive insulating layer, the latter comprising a quinazoline compound having the formula

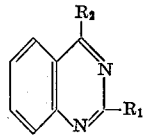

in which $R_1$ and $R_2$ are aryl groups.

4. An electrophotographic material comprising a conductive support layer and a photoconductive insulating layer, the latter comprising a quinazoline compound having the formula

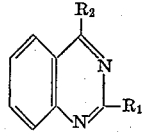

in which $R_1$ is an aryl and $R_2$ is an alkyl group.

5. An electrophotographic material comprising a conductive support layer and a photoconductive insulating layer, the latter comprising a quinazoline compound having the formula

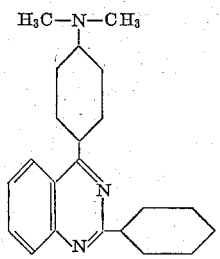

6. An electrophotographic material comprising a conductive support layer and a photoconductive insulating layer, the latter comprising a quinazoline compound having the formula

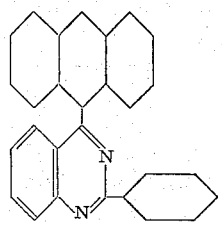

7. An electrophotographic material comprising a conductive support layer and a photoconductive insulating layer, the latter comprising a quinazoline compound having the formula

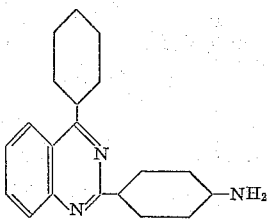

8. An electrophotographic material comprising a conductive support layer and a photoconductive insulating layer, the latter comprising a quinazoline compound having the formula

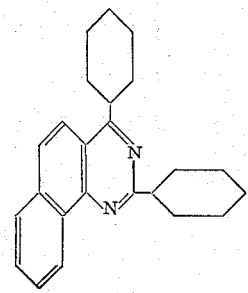

9. A photographic reproduction process which comprises exposing an electrostatically charged supported photoconductive insulating layer to light under a master and developing the resulting image with an electroscopic material, the photoconductive layer comprising a quinazoline compound having the formula

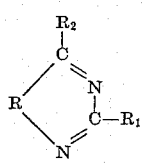

in which R is an ortho-arylene group, $R_1$ is an aryl group, and $R_2$ is selected from the group consisting of aryl, alkyl, aralkylene, and aralkyl groups.

10. A process according to claim 9 in which the photoconductive layer contains at least one compound selected from the group consisting of resins and optical sensitizers.

11. A photographic reproduction process which comprises exposing an electrostatically charged supported photoconductive insulating layer to light under a master and developing the resulting image with an electroscopic material, the photoconductive layer comprising a quinazoline compound having the formula

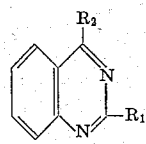

in which $R_1$ and $R_2$ are aryl groups.

12. A photographic reproduction process which comprises exposing an electrostatically charged supported photoconductive insulating layer to light under a master and developing the resulting image with an electroscopic material, the photoconductive layer comprising a quinazoline compound having the formula

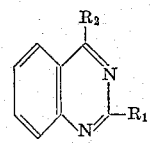

in which $R_1$ is an aryl and $R_2$ is an alkyl group.

13. A photographic reproduction process which comprises exposing an electrostatically charged supported photoconductive insulating layer to light under a master and developing the resulting image with an electroscopic material, the photoconductive layer comprising a quinazoline compound having the formula

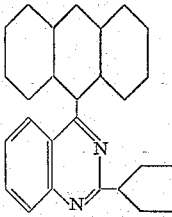

14. A photographic reproduction process which comprises exposing an electrostatically charged supported photoconductive insulating layer to light under a master and developing the resulting image with an electroscopic material, the photoconductive layer comprising a quinazoline compound having the formula 15. A photographic reproduction process which comprises exposing an electrostatically charged supported photoconductive insulating layer to light under a master and developing the resulting image with an electroscopic material, the photoconductive layer comprising a quinazoline compound having the formula

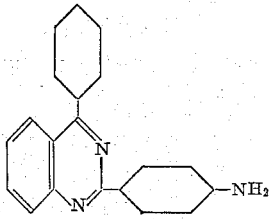

16. A photographic reproduction process which comprises exposing an electrostatically charged supported photoconductive insulating layer to light under a master and developing the resulting image with an electroscopic material, the photoconductive layer comprising a quinazoline compound having the formula

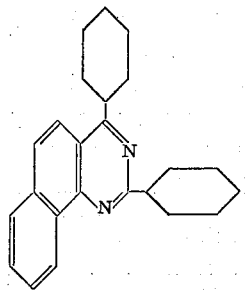

17. An electrophotographic material comprising a conductive support layer and a photoconductive insulating layer, the latter comprising a quinazoline compound having the formula

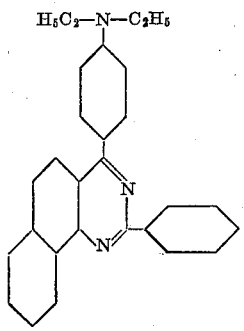

18. A photographic reproduction process which comprises exposing a charged supported photoconductive insulating layer to light under a master and developing the resulting image, the photoconductive layer comprising a quinazoline compound having the formula

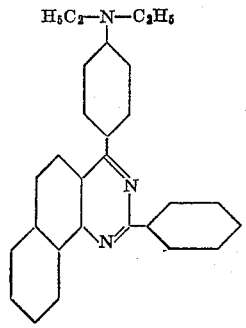

19. An electrophotographic material comprising a conductive support layer and a photoconductive insulating layer, the latter comprising a quinazoline compound having the formula

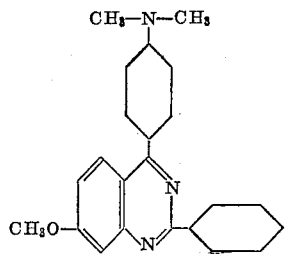

20. An electrophotographic material comprising a conductive support layer and a photoconductive insulating layer, the latter comprising a quinazoline compound having the formula

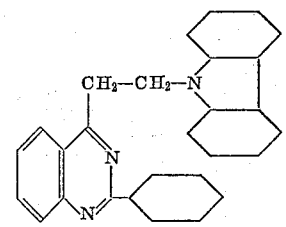

21. An electrophotographic material comprising a conductive support layer and a photoconductive insulating layer, the latter comprising a quinazoline compound having the formula

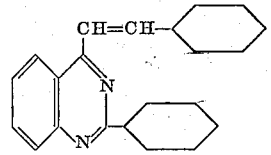

22. An electrophotographic material comprising a conductive support layer and a photoconductive insulating layer, the latter comprising a quinazoline compound having the formula

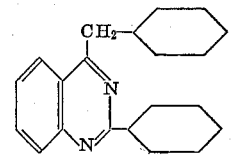

23. An electrophotographic material comprising a conductive support layer and a photoconductive insulating layer, the latter comprising a quinazoline compound having the formula

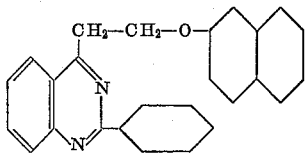

24. A photographic reproduction process which comprises exposing an electrostatically supported photoconductive insulating layer to light under a master and developing the resulting image with an electroscopic material, the photoconductive layer comprising a quinazoline compound having the formula

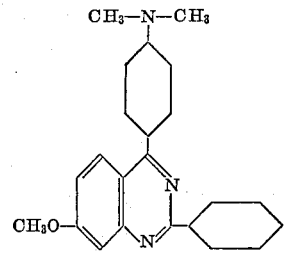

25. A photographic reproduction process which comprises exposing an electrostatically charged supported photoconductive insulating layer to light under a master and developing the resulting image with an electroscopic material, the photoconductive layer comprising a quinazoline compound having the formula

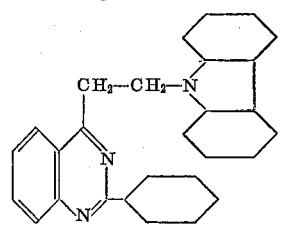

26. A photographic reproduction process which comprises exposing an electrostatically charged supported photoconductive layer to light under a master and developing the resulting image with an electroscopic material, the photoconductive layer comprising a quinazoline compound having the formula

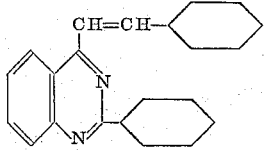

27. A photographic reproduction process which comprises exposing an electrostatically charged supported photoconductive insulating layer to light under a master and developing the resulting image with an electroscopic material, the photoconductive layer comprising a quinazoline compound having the formula

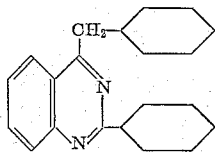

28. A photographic reproduction process which comprises exposing an electrostatically charged supported photoconductive insulating layer to light under a master and developing the resulting image with an electroscopic material, the photoconductive layer comprising a quinazoline compound having the formula

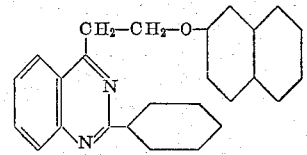

References Cited in the file of this patent

UNITED STATES PATENTS

| | | |
|---|---|---|
| 1,780,879 | Hentrich et al. | Nov. 4, 1930 |
| 2,176,413 | Baumann et al. | Oct. 17, 1939 |
| 2,954,291 | Clark | Sept. 27, 1960 |

FOREIGN PATENTS

| | | |
|---|---|---|
| 562,336 | Belgium | May 13, 1958 |
| 1,074,047 | Germany | Jan. 28, 1960 |

OTHER REFERENCES

Vartanian: Acta Physicochimica URSS 22, pp. 201–24 (1947), 96–1PC.

Inokuchi: Bull. Chem. Soc. Japan, 27, pp. 22–27 (1954), 96–1PC.